Aug. 16, 1960
J. W. CROWE
2,949,602
CRYOGENIC CONVERTER
Filed April 11, 1958

INVENTOR
JAMES W. CROWE

BY George Baron
ATTORNEY

United States Patent Office 2,949,602

Patented Aug. 16, 1960

2,949,602

CRYOGENIC CONVERTER

James W. Crowe, Hyde Park, N.Y., assignor to International Business Machines Corporation, New York, N.Y., a corporation of New York Filed Apr. 11, 1958, Ser. No. 727,919

3 Claims. (Cl. 340—347)

This invention relates to an analog to digital converter, and more particularly to a circuit employing superconductive elements to obtain the conversion of an analog function to a digital output.

The properties and characteristics of superconductors have been treated in such texts as "Superfluids," volume I, by Fritz London, published in 1950 in New York by John Wiley and Sons, Inc. and "Superconductivity" by D. Shoenberg, published in 1952 in London by the Cambridge University Press. In general, a superconductor is a metal, an alloy or a compound that is maintained at very low temperatures, i.e., from 17° Kelvin to the practical attainability of absolute zero, in order that it may present no resistance to current flow therein. It was discovered that in the case of mercury its electrical resistance decreased as a function of decreasing temperature until at a given temperature (about 4.12° K.) the resistance very sharply vanished, or its measurement was too small to be detected. The temperature at which the transition to zero resistance took place in mercury was referred to as its critical temperature; its state, upon reaching zero resistance, was that of a superconductor.

The critical temperature varies with different materials and for each material it is lowered as the intensity of the magnetic field around the material is increased from zero. Once a body of material is rendered superconductive, it may be restored to the resistive or normal state by the application of a magnetic field of a given intensity to such material; the magnetic field necessary to destroy superconductivity is called the critical field. Thus it is seen that one may destroy superconductivity in a specific material by applying energy to it in the form of heat so as to make such material reach its critical temperature, or in the form of a magnetic field so as to make it reach its critical field.

A concept which is pertinent to the present invention is that a magnetic field applied to either a superconducting plane or an area enclosed by a superconducting loop cannot cause any net change in flux through such plane or loop. In the case of a superconducting loop, the net flux through the loop would be maintained at zero by equal and opposite flux lines which are supported by a circulating current around the loop. When the circulating current exceeds the critical current value of any part of the superconductor comprising the loop, superconductivity is destroyed and the circulating currents are dissipated through $I^2R$ losses in the loop.

Assume a magnetic field is applied perpendicular to the plane of a ring-shaped superconductor through which, initially, the flux is zero. If the applied field is increased the net flux remains zero until the critical value is reached and such loop is driven resistive. If the applied field is increased further while the loop is in its normal conducting state, the field penetrates the ring, and on decreasing, the field returns to its critical value, the loop will become entirely superconducting and the flux will remain "trapped" or "frozen in" at the critical value. With the external field now zero there is a non-zero flux through the ring that is supported by a circulating current in the superconductor ring or loop. If the applied magnetic field is reversed in direction and increased beyond the critical value of the superconductor and again reduced to zero, flux of the opposite sign or polarity will be trapped, causing a circulating current to flow, but in a direction that is reverse to that noted above. In practice, an input circuit supplies the critical magnetic field to the superconductive loop and flux changes through the loop are detected by a winding inductively coupled with the loop.

The aforementioned characteristics of superconductors are utilized in obtaining an analog to digital converter. A closed superconductor loop is maintained in a bath of liquid helium so as to maintain such ring or loop in its superconductive state. The loop may include a hard superconductor and a soft superconductor. The drive coil may be inductively coupled to the hard superconductor. When a predetermined minimum current Ic is made to flow into the drive coil, flux linkage takes place between the drive coil and the hard superconductor, but no flux penetrates the loop while the latter remains in its superconductive state. A circulating current is induced in the loop as a consequence of such flux linkage, such circulating current increasing with increasing drive current until the critical current of the soft superconductor is reached. At this point, the soft superconductor goes normal conducting and heats up, causing the induced circulating current to dissipate as an $I^2R$ loss. At the time that the soft superconductor goes normal, the magnetic field about the soft superconductor collapses. Such field collapse can be detected in a sense winding associated with the soft superconductor.

During the transition of the soft superconductor from its superconductive state to its normal resistive state, the drive current may still be applied, but it is ineffective to cause the hard superconductor in the loop to go normal. The soft superconductor, upon returning to its superconductor state when its temperature returns to its ambient temperature, returns the loop to its superconductive state, causing the flux linking the drive coil to the hard superconductor to be trapped. Now if the current in the drive coil continues to increase to a point where it now has the value of 2*Ic*, such increasing drive current will create a circulating current in the superconducting loop during the period that the drive current is increasing from Ic to 2Ic. Such circulating current will increase at the same time that the drive current Ic is increasing to 2Ic until somewhere close to 2Ic the soft superconductor goes normal, heats up, and produces another output pulse in the output circuit coupled to the soft superconductor. As the driving current increases in predetermined increments, one obtains an output signal. The number of individual output signals observed or sensed can be used as a measure of the current input of the drive coil. In a sequence reverse to the above described, when the drive current is decreased the flux is taken out of the hard superconducting coil in increments. The output pulses thus received are opposite in sign and can be used to count a symmetrical digital count-down. Thus the counter shows an increasing count for rising currents and a decreasing count for falling currents.

It is an object of the present invention to provide a novel analog to digital converter.

It is yet another object to provide an analog to digital converter employing superconductive elements.

It is yet another object to provide an analog to digital converter that is of very small physical dimensions.

Figure 1:
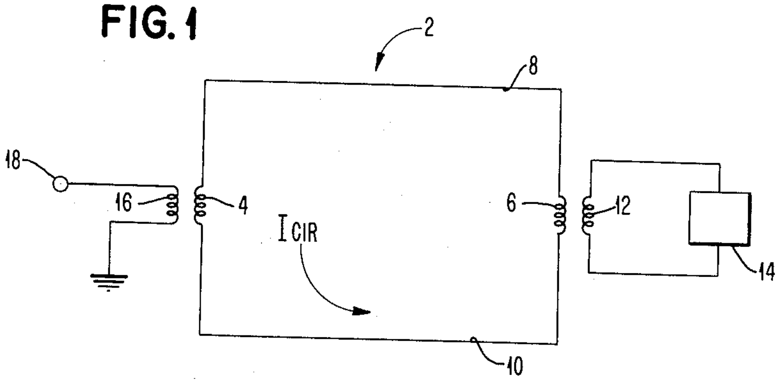
Fig. 1 is a schematic representation of the analog to digital converter employing superconductor elements.

Referring to Fig. 1 there is shown a closed ring or loop 2 that includes a hard superconductor 4 and a soft superconductor 6. A hard superconductor is a superconductor which, at a given operating temperature, requires a relatively high field or current to cause it to go resistive or normal conducting whereas a soft superconductor requires a relatively low field or low current to be driven normal conducting. Consequently, hard superconductor 4 would be composed of bismuth-lead eutectic, vanadium, columbium or tantalum, whereas the soft superconductor 6 could be a lead alloy such as lead-indium. The connecting portions 8 and 10 of the loop could be composed of the same material as coil 4. The entire loop is deposited as an extremely thin film, i.e., of the order of 1000 Angstrom units, on a suitable substrate such as sapphire, aluminum oxide, magnesium fluoride, silicon monoxide, mica, quartz, or other material that is an electrical insulator but a relatively good conductor of heat. The substrate is of the same order of thickness as that of the superconductors 4 and 6.

Located immediately adjacent but electrically insulated from the soft superconductor 6 is a sense winding 12, such sense winding having a voltage produced thereacross when the soft superconductor 6 becomes normal conducting. The detector 12 is connected to a sense amplifier 14, the latter serving to produce amplification of the weak signals appearing across detector winding 12. An example of a sense amplifier is shown and described in a copending application for "Electrical Apparatus," Serial No. 615,830, filed on November 8, 1957, by applicant.

Mutually coupled to the hard superconductor 4 is an input winding or driving coil 16. Such coil 16 is a hard superconductor that remains superconductive throughout the operating range of the instant analog to digital converter. The direct current for creating a magnetic field about input winding 16 is applied at input terminal 18. The entire circuit components of Fig. 1, except for the sense amplifier 14, may be encased in a plastic carrier in order to make the entire device self-supporting before the entire circuit is placed in its liquid helium bath.

Figure 2:
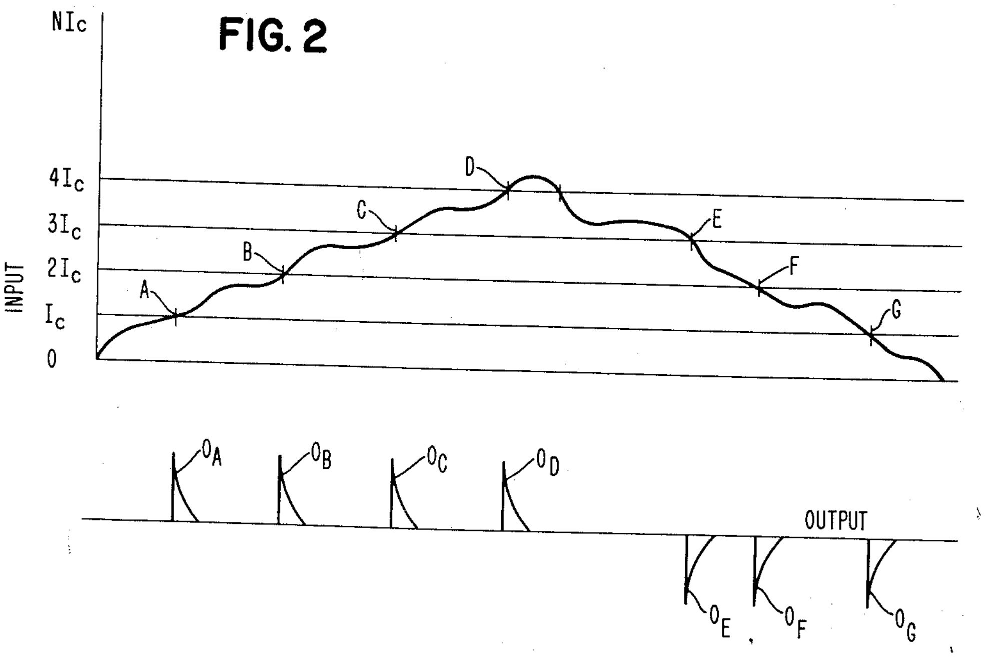
Fig. 2 is an input-output plot of drive current variations with time and the output signals obtained as a result of changing current.

The operation of the circuit will now be described with reference to Figs. 1 and 2. A physical quantity, characteristic, result, or the like may be represented by a variable but continuous direct current output. The latter quantity is applied as an input signal to input terminal 18 of input winding 16. Assume that the varying direct current starts from zero and increases in predetermined increments designated as $Ic$ in Fig. 2. As the current builds up from zero to $Ic$, flux linkage between coil 16 and coil 4 takes place. But, as is known, a superconductive ring or loop resists the passage of an applied field therethrough while such ring is in its superconductive state. The ring acts as a shield to magnetic lines of flux. The "shield" arises, it is believed, because a circulating current $Icir$ is induced in the closed superconducting ring as flux attempts to penetrate the closed ring. Such $Icir$ current creates its own flux field that opposes and neutralizes some of the flux of the applied field. The circulating current $Icir$ builds up until it reaches a value that exceeds the critical current of soft superconductor 6. Such a critical current is shown at point A of Fig. 2.

When the critical current of soft superconductor 6 is reached, the latter becomes normal conducting, permitting flux to break through the plane of the ring and produce an output pulse $O_A$ across winding 12, which pulse can be amplified by sense amplifier 14. The soft superconductor 6 heats up as a consequence of its being driven to its normal state and the circulating current $Icir$ disappears as an $I^2R$ loss in the now normal state of soft superconductor 6. The flux in the hard superconductor 4 builds up while the circulating current $Icir$ increases, but when the soft superconductor 6 goes normal, it momentarily heats up such soft superconductor 6, such heating serving to regeneratively drive it further into its normal state. During this transition, current $Ic$ may still be increasing toward $2Ic$, but the actual circulating current $Icir$ drops to zero. Such continuously applied current is not effective to cause the hard superconductor 4 to go normal conducting, but as soon as soft superconductor 6 cools down to a temperature that will return it to its superconductive state, there is a trapping of a unit of flux in hard superconductor 4.

When the current in drive coil 16 increases toward $2Ic$, the circulating current $Icir$ builds up again to the point B whereupon soft superconductor 6 again becomes normal conducting, an output pulse $O_B$ is sensed, and another unit of flux is trapped in hard superconductor 4. The cycle is repeated so long as the drive current increases, producing outputs $Oc$ and $Od$ for increments of drive current represented by points C and D. When the driving current diminishes, circulating currents $Icir$ are built up in the loop in the opposite direction to that shown in Fig. 1, such circulating currents driving soft superconductor 6 normal to produce output pulses $O_E$, $O_F$, $O_G$, etc. Such output pulses are opposite in polarity to those produced when the driving current was increasing. However, during the drop in driving current $Ic$, units of trapped magnetic flux are released from hard superconductor 4. In effect, while current $Ic$ is increasing, it is "throwing" into the closed superconductive loop, at discrete times, units of flux and, while it is decreasing, it is expelling such trapped units of flux, also at discrete times, namely, when the soft superconductor 6 goes through a transition from its superconductive state to its normal state.

The above described circuit serves as an analog to digital converter because it converts a continuously changing quantity into discrete pulses, and the number of pulses observed becomes a measure of the level reached by such changing quantity. Where desired, the output pulses $O_G$, $O_F$, etc. that were obtained during the return of driving current $Ic$ to zero could be eliminated by employing a unipolar sensing device in conjunction with sense amplifier 14.

It should be noted that there are certain conditions which must be maintained in order to permit the present invention to operate properly. First the heat relaxation time of the soft superconductor must be fast compared to the rise time of driving current $Ic$. The soft superconductor 6 will be selected to have a low mass and will be placed on an electrical insulator that has very good heat conductivity characteristics so that the return of the soft superconductor to the ambient temperature of liquid helium will be rapid, say, of the order of a 100 millimicroseconds. The driving current $Ic$ should have a rise time that is sufficiently less than the heat relaxation time of the soft superconductor 6, sufficiently less so that the latter can return to its superconductive state and permit the next increment of driving current to be effective to create a circulating current $Icir$ in the superconductive loop, such $Icir$ being effective to drive the soft superconductor 6 normal resistive when the driving current reaches $2Ic$.

It is also noted that the field created by the drive coil 16 can never be so high as to drive the hard superconductor 4 to its normal state. But this requirement can be met by selecting a substance for hard superconductor 4, for example, bismuth-lead eutectic, that would require over 10,000 gauss to drive it normal resistive. Also the drive coil 16 is composed of a hard superconductor that has a very high critical current so that it will not be driven normal resistive during the highest anticipated value of current, $NIc$, that will be sent through drive coil 16.

The instant invention has obtained a novel analog to digital converter wherein such converter is operable at extremely low temperatures, i.e., close to absolute zero. The digital to analog converter will have particular application to the ever-growing field of cryogenics wherein it is very desirable to employ circuitry that is consonant with and in harmony with the problems unique to superconductors.

What is claimed is:

1. An analog to digital converter comprising a closed loop of superconductive material, said loop including a first hard superconductor and a soft superconductor, a magnetic field producing means inductively coupled to said hard superconductor, such magnetic field producing means including a second hard superconductor inductively coupled to said first hard superconductor, means for supplying a varying signal as a driving current to said magnetic field producing means so as to induce a circulating current in said closed loop, said circulating current being high enough to drive said soft superconductor to its normal resistive state but not high enough to drive said first hard superconductor to its normal resistive state, and means for sensing when said soft superconductor is driven normal resistive.

2. An analog to digital converter for converting increments of direct current to digital pulse outputs comprising a closed loop of superconductive material, said loop including a first hard superconductor and a soft superconductor, a magnetic field producing means inductively coupled to said hard superconductor, such magnetic field producing means including a second hard superconductor inductively coupled to said first hard superconductor, means for supplying such increments of direct current as a varying signal to said magnetic field producing means so as to induce a circulating current in said loop whereby said soft superconductor is driven to its normal resistive state during one such increment of direct current, and means for sensing the change of said soft superconductor from its superconductive state to its normal state.

3. An analog to digital converter for converting increments of direct current to digital pulse outputs comprising a closed loop of superconductive material, said loop including a first hard superconductor and a soft superconductor, a magnetic field producing means inductively coupled to said hard superconductor, such magnetic field producing means including a second hard superconductor inductively coupled to said first hard superconductor, means for supplying such increments of direct current as a varying signal to said magnetic field producing means so as to induce a circulating current in said loop, a sensing circuit coupled to said soft superconductor, said soft superconductor being driven normal resitive when said induced circulating current reaches the critical current of said soft superconductor so as to produce an output pulse in said sensing circuit, whereby a unit of flux is trapped in said first hard superconductor when said soft superconductor returns to its superconductive state.

References Cited in the file of this patent

UNITED STATES PATENTS 2,832,897 Buck ---------------- Apr. 29, 1958